United States Patent
Sadeghian Marnani et al.

(10) Patent No.: US 10,578,643 B2
(45) Date of Patent: Mar. 3, 2020

(54) DETERMINING INTERACTION FORCES IN A DYNAMIC MODE AFM DURING IMAGING

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Mehmet Selman Tamer, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/757,704

(22) PCT Filed: Aug. 17, 2016

(86) PCT No.: PCT/NL2016/050579
§ 371 (c)(1),
(2) Date: Mar. 6, 2018

(87) PCT Pub. No.: WO2017/030439
PCT Pub. Date: Feb. 23, 2017

(65) Prior Publication Data
US 2019/0025340 A1  Jan. 24, 2019

(30) Foreign Application Priority Data
Aug. 18, 2015  (EP) ..................... 15181449

(51) Int. Cl.
*G01Q 40/02* (2010.01)
*G01Q 60/34* (2010.01)
(Continued)

(52) U.S. Cl.
CPC ............. *G01Q 40/02* (2013.01); *G01Q 20/02* (2013.01); *G01Q 40/00* (2013.01); *G01Q 60/34* (2013.01)

(58) Field of Classification Search
CPC ............................... G01Q 40/00; G01Q 70/00
See application file for complete search history.

(56) References Cited

FOREIGN PATENT DOCUMENTS

| FR | 2887986 A1 | 1/2007 | |
|---|---|---|---|
| WO | WO 2005/098869 A1 | 10/2005 | |
| WO | WO-2005098869 A1 * | 10/2005 | ............. G01Q 40/00 |

OTHER PUBLICATIONS

Akihiro et al., "A Method for Determining the Spring Constant of Cantilevers for Atomic Force Microscopy," Measurement Science and Technology, vol. 7, No. 2, pp. 179-184 (1996) XP020063966.
(Continued)

*Primary Examiner* — David E Smith
*Assistant Examiner* — Hsien C Tsai
(74) *Attorney, Agent, or Firm* — Leydig, Voit & Mayer, Ltd.

(57) ABSTRACT

A method and system for calibrating force (F12) in a dynamic mode atomic force microscope (AFM). An AFM tip (11) is disposed on a first cantilever (12). The first cantilever (12) is actuated to oscillate the AFM tip (11) in a dynamic mode. A first sensor (16) is configured to measure a first parameter (A1) of the oscillating AFM tip (11). A second sensor (26) is configured to measure a second parameter (A2) of a resilient element (22). The oscillating AFM tip (11) is moved in proximity to the resilient element (22) while measuring the first parameter (A1) of the AFM tip (11) and the second parameter (A2) of the resilient element (22). A force (F12) between the oscillating AFM tip (11) and the resilient element (22) is calculated based on the mea-
(Continued)

sured second parameter (A2) and a calibrated force constant (K2) of the resilient element (22).

14 Claims, 4 Drawing Sheets

(51) Int. Cl.
    *G01Q 40/00*     (2010.01)
    *G01Q 20/02*     (2010.01)

(56) References Cited

OTHER PUBLICATIONS

Min-Seok et al., "Calibration of the Spring Constants of Various AFM Cantilevers with the Small Uncertainty Level of 2%," SICE-ICASE International Joint Conference, IEEE, pp. 2532-2537 (Oct. 2006) XP031049827.

European Patent Office, International Search Report in corresponding International Application No. PCT/NL2016/050579 dated Nov. 4, 2016 (3 pages).

Onaran et al., "A New Atomic Force Microscope Probe with Force Sensing Integrated Readout and Active Tip," AIP Review of Scientific Instruments 77, 023501, pp. 023501-023501-7 (2006).

Cleveland et al., "Energy Dissipation in Tapping-Mode Atomic Force Microscopy," AIP Applied Physics Letters 72, No. 20, pp. 2613-2615 (May 18, 1998).

Sarioglu et al., "High-Resolution Nanomechanical Mapping Using Interferometric-Force-Sensing AFM Probes," Journal of Microelectromechanical Systems, vol. 20, No. 3, pp. 654-664 (Jun. 2011).

Sahin et al., "An Atomic Force Microscope Tip Designed to Measure Time-Varying Nanornechanical Forces," Nature Nanotechnology, vol. 2, pp. 507-514 (Jul. 29, 2007).

* cited by examiner

DETERMINING INTERACTION FORCES IN A DYNAMIC MODE AFM DURING IMAGING

CROSS-REFERENCE TO RELATED APPLICATIONS

This patent application is a U.S. National Phase of PCT International Application No. PCT/NL2016/050579, filed Aug. 17, 2016, which claims priority to European Application No. 15181449.8, filed Aug. 18, 2015, which are both expressly incorporated by reference in their entireties, including any references contained therein.

TECHNICAL FIELD AND BACKGROUND

The present disclosure relates to a dynamic mode atomic force microscope (AFM). The disclosure further relates to a method of calibrating a force in a dynamic mode AFM, determining the force in a dynamic mode AFM measurement, and using a dynamic mode AFM for applying a predetermined force to a sample surface.

In a dynamic mode AFM (e.g. Tapping Mode AFM or Non-Contact mode AFM), an AFM tip periodically approaches, interacts and retracts from a sample surface and experiences for example long range attractive forces and/or short range repulsive forces. The contact area between the tip and sample surface is typically in the nanoscale range which implies that the tip-sample forces, in the neighborhood of nano Newtons, can create huge stress and easily damage the sample surface or the tip itself. Accordingly, it is desired to determine the time varying nano-mechanical forces during imaging for sensitive and fragile samples and at the same time for increasing the tip lifetime in tapping mode AFM which is the preferred mode of operation.

In a dynamic mode AFM, the frequency, amplitude and phase of the cantilever oscillation are the primary observable parameters of the system. For example, a sine wave is applied on an oscillator element and the cantilever is driven into oscillation at the same frequency with the oscillator, a laser beam is directed onto the cantilever and a reflection of the laser beam is monitored to determine the oscillation frequency, amplitude and phase. However, conventionally, the nonlinear interaction forces between the probe tip and sample surface cannot be extracted from the observable parameters of the sinusoidal signal; only energy dissipation can be monitored. See for example J. P. Cleveland et al., Appl. Phys. Lett., Vol. 72, No. 20, 1998.

To determine the tip sample interactions various method exist. For example, F. L. Degertekin et al. (Rev. of Sci. Instr. Vol. 77, 2006) describes a micro-machined membrane with an integrated displacement sensor to extract tip sample interactions. As another example, O. Sahin et al. (Nature Nanotechnology, Vol. 2, 2007) describes a torsional harmonic cantilever wherein the structure of the cantilever is modified to place the tip that is offset from the long axis of the cantilever. Torsional motion of the cantilever is used to extract tip sample interactions. As another example, A. F. Sarioglu et al. (Journal of Microelectromechanical Systems, Vol. 20, 2011) describes an integrated high bandwidth force sensor, wherein the cantilever has an interferometric force sensor to resolve tip sample interactions. Diffraction grating at the end of the cantilever beam is used as a force sensor to extract tip sample interactions. Unfortunately, the known methods require custom construction of micro-machined elements and/or adaptation of the probe shape.

Accordingly it is desired to provide methods and systems for determining force in a dynamic mode AFM wherein disadvantages of the prior art are alleviated. For example, it is desired to measure tip sample interaction for all types of AFM cantilevers with different geometries such as triangular, rectangular, or special design. Furthermore it is desired to measure the tip sample interaction for all kinds of operation modes at static, dynamic or quasi-static regimes. Furthermore it is desired to monitor the change in tip sample interactions for different surface scenarios.

SUMMARY

One aspect of the present disclosure provides a method of calibrating a force in a dynamic mode atomic force microscope. The method comprises providing an AFM tip disposed on a first cantilever. The first cantilever is actuated to oscillate the AFM tip at chosen frequency or frequencies in a dynamic mode. A first sensor is configured to measure a (first) observable parameter of the oscillating AFM tip, e.g. a (relative) amplitude, frequency or phase of the oscillation. In addition, a resilient element is provided and a second sensor is configured to measure a (second) observable parameter of the resilient element, e.g. deflection and/or displacement of the resilient element. The resilient element has a force constant (also referred to as spring constant) which can be calibrated as a function of the second parameter. According to the method, the oscillating AFM tip is moved in proximity to the resilient element while measuring the first parameter of the AFM tip and the second parameter of the resilient element. A force between the oscillating AFM tip and the resilient element can thus be calculated based on the measured second parameter and calibrated force constant of the resilient element. The correlation between the calculated force and the measured first parameter of the oscillating AFM tip can be stored as calibration of the force.

It will be appreciated that changes in the second measured parameter of the resilient element result from interaction forces between the AFM tip and the resilient element. The measured second parameter of the calibrated resilient element provides a measure to calculate the magnitude of the interaction forces. At the same time, because also the first parameter of the AFM tip is measured and the first parameter is affected by the interaction forces, the forces can be calibrated as a function the first parameter, e.g. the oscillation amplitude and/or frequency. This allows to measure tip sample interaction for all types of AFM cantilevers with different geometries and for different kinds of operation modes at static, dynamic or quasi-static regimes. Furthermore it the change in tip sample interactions for different surface scenarios can be simulated. In view of these and other advantages described below, an improved methods and systems for determining force in a dynamic mode AFM can be obtained.

Preferably, the resilient element is formed by a second cantilever. The force constant of the second cantilever, e.g. the amount of bending as a function of force on the cantilever can be known or calibrated. For example, the force constant can be calibrated by applying a known force and measuring the second parameter indicative of the deflection. Other methods for calibrating the second cantilever force constant include theoretical calculations according to the dimensions and/or materials of the cantilever, measurement of the gravitational deflection due to added masses, measurement of the deflection due to cantilevers of known force (spring) constant, measurement of the deflection due to the viscosity of the medium surrounding the cantilever, the "Cleveland" added-mass method, and the Thermal Noise method. Alternative to a cantilever, also other resilient elements can be used such as a membrane or a double clamped beam.

By providing a resilient element, e.g. second cantilever, having a relatively high fundamental frequency (lowest resonance frequency), with respect to that of the tapping (first) cantilever, the resilient element can rapidly respond to interaction forces and motion resulting from the periodic proximity of the tapping AFM tip. For example, the resilient element preferably has a fundamental frequency that is at least a factor ten higher than that of the first cantilever, e.g. twenty, thirty or even hundred times higher. For example, the first cantilever may be a standard tapping mode cantilever having a fundamental frequency typically higher than forty kilohertz, e.g. between forty and hundred and fifty kilohertz. For example, the resilient element may be an ultra high frequency cantilever having a fundamental frequency higher than hundred kilohertz, preferably higher than one megahertz, e.g. between one-and-half and ten megahertz. For example, the resilient element may be an ultra short cantilever (USC) that is at least two times shorter than the first cantilever.

The first and/or second sensors may comprise any means for determining a time-dependent motion of the AFM cantilever and/or resilient element. For example the sensor comprises a position sensitive detector configured to measure a position of a respective light beam on the position sensitive detector reflected by the cantilever and/or resilient element. Accordingly, the position of the light spot is a function of the first and/or second parameter. For example, the first parameter is a function of one or more of an amplitude, frequency and/or phase of the oscillation of the AFM tip. For example, the second parameter can be a function of a deflection and/or displacement of the resilient element.

The calibrated force constant of the resilient element may comprise for example a characterization of the second parameter as a function of the force on the resilient element. Preferably, the force constant of the resilient element (at the position of interaction with the probe tip) is at least a factor ten higher than a force constant of the first cantilever (at the position of the probe tip). For example, the force constant of the resilient element is at least ten, thirty, hundred, two hundred, e.g. as high as five hundred Newton per metre. Of course the force constant may be related to the resonance frequency. A practical limit for the maximum desired force constant can be determined by the fact that the amount of deflection, for higher force constant, can be relatively low, and hence more difficult to measure. For example, the force constant of the first cantilever can be any value wherein the first cantilever does not stick on the resilient element due to attractive forces for example capillary or electrostatic forces and continue oscillation.

A further aspect of the present disclosure provides a method of determining a force in a dynamic mode atomic force microscope measurement. The method comprises calibrating the dynamic mode atomic force microscope as described herein and moving the oscillating AFM tip over a sample surface while measuring the first parameter. Accordingly, the force between the oscillating AFM tip and the sample surface can be calculated based on the force that is stored as a function of the measured first parameter of the oscillating AFM tip during calibration.

A further aspect of the present disclosure provides a method of using a dynamic mode atomic force microscope for applying a predetermined force to a sample surface. The method comprises determining the force as described herein while varying a distance between the average AFM tip and the sample surface distance during an oscillation cycle until the predetermined force is achieved.

A further aspect of the present disclosure provides a dynamic mode atomic force microscope e.g. for executing the methods describe herein. The AFM comprises an AFM tip disposed on a first cantilever and an actuator configured to actuate the first cantilever to oscillate the AFM tip in a dynamic mode. The AFM comprises or interacts with a first sensor configured to measure a first parameter of the oscillating AFM tip. The AFM may comprise or interact with an optical beam deflection (OBD) system. The OBD may comprise a resilient element with a certain force constant and a second sensor configured to measure a second parameter of the resilient element. Preferably, the resilient element comprises a second cantilever. For example, the first cantilever is arranged with respect to the second cantilever to dynamically tap a surface of the second cantilever with the AFM tip of the first cantilever.

The system may comprise a controller that is configured and programmed for calibrating the force constant of the resilient element as a function of the second parameter. Alternatively, the force constant of the resilient element may be known or determined through other means. The controller may be further configured and programmed for moving the oscillating AFM tip in proximity to the resilient element while measuring the first parameter of the AFM tip and the second parameter of the resilient element. A force between the oscillating AFM tip and the resilient element may be calculated, e.g. by the controller or other processor, based on the measured second parameter and calibrated force constant of the resilient element. The calculated force may be stored, e.g. in a memory or computer writable medium, as a function of the measured first parameter of the oscillating AFM tip.

The system may additionally comprise or interact with a light source configured to direct a respective light beam onto the first and/or second cantilever. For example, the first and/or second light beams may be laser beams which may originate from different or the same light source. For example, each sensor comprises a position sensitive detector for measuring a deflection of the respective light beam resulting from movement of the respective cantilever. The sensor data may be processed by a measurement module configured to receive data from the sensor and calculate the first or second parameter. Preferably, a feedback controller is configured to control a relative (average) distance between the AFM tip and the resilient element distance during an oscillation cycle. For example, the feedback controller is configured to control the relative distance based on the measurement of the first parameter.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. In some instances, detailed descriptions of well-known devices and methods may be omitted so as not to obscure the description of the present systems and methods. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

Figure 1A:
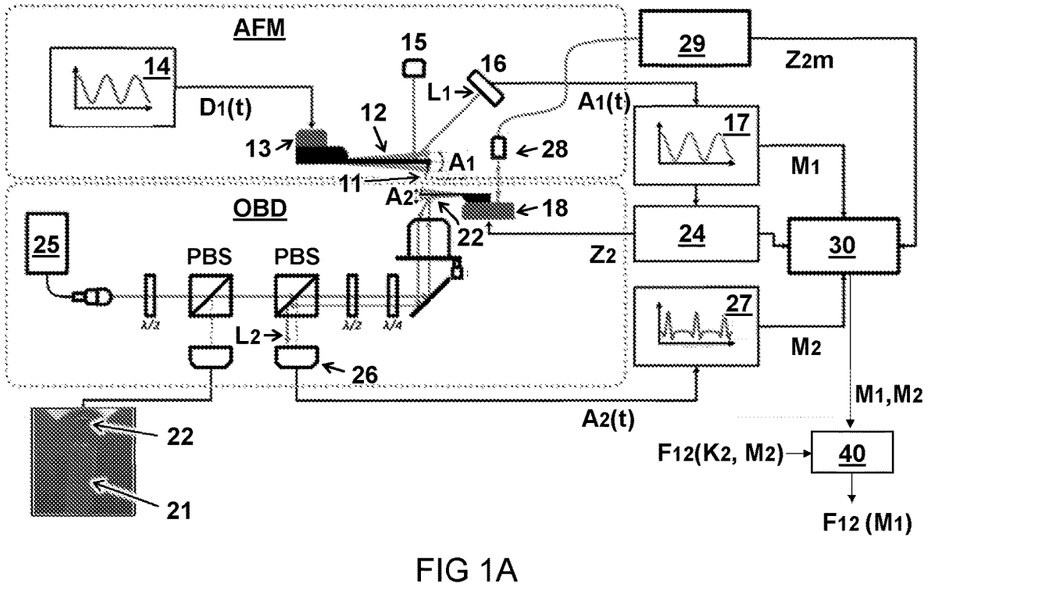
FIG. 1A schematically illustrates an embodiment of AFM system combined with an optical beam deflection setup for calibration of the interaction forces.

FIG. 1A schematically illustrates an embodiment of an atomic force microscope (AFM) system combined with an optical beam deflection (OBD) setup for calibration of the interaction forces.

In the shown embodiment, the AFM system comprises a probe tip i.e. AFM tip 11. The AFM tip 11 is disposed on a first cantilever 12. For example, the first cantilever 12 is a tapping mode cantilever.

In one embodiment, an actuator 13 is configured to actuate the first cantilever 12 to oscillate the AFM tip 11 in a dynamic mode, e.g. tapping mode. For example, the actuator 13 comprises a piezo element. A first sensor 16 is configured to measure a parameter "A1" of the oscillating AFM tip 11. For example, the parameter "A1" can be any observable parameter that is a function of the (time dependent) angle or displacement of the oscillating cantilever 12. In one embodiment, the first sensor 16 comprises a position sensitive detector (PSD) configured to measure a position of a first light beam L1 on the position sensitive detector PSD reflected by the oscillating surface of the first cantilever. For example, the position on the detector is a measure for the angle of the cantilever of the oscillating AFM tip 11. More specifically, e.g. a movement or bending of the cantilever strip 12 may cause deflection of the light beam L1. In one embodiment, the system comprises a light source 15 configured to direct a first light beam L1 onto the first cantilever 12.

In one embodiment, the system comprises a measurement module 17 configured to receive time dependent measurements of the first parameter A1(t) from the first sensor 16 and calculate a first derived parameter "M1", such as an amplitude of the oscillation, a frequency of the oscillation and/or a phase of the oscillation. In another or further embodiment, the AFM comprises a feedback controller 27 configured to control a relative distance between the AFM tip 11 and the resilient element 22. For example, the distance may be determined by control of the height "Z2" of the translation stage 18, e.g. calibrated with a displacement sensor 28 (e.g. vibrometer). Alternative, or in addition to moving the resilient element, also the cantilever 12 may be moved. In one embodiment, the feedback may be used to control a height "Z2" of the translation stage 18 such as to obtain a certain amplitude, frequency and/or phase which may correlate or can be derived from the measured parameter A1(t).

In one embodiment, the system comprises a resilient element 22. In the embodiment shown, a second sensor 26 is configured to measure a second parameter "A2" of the resilient element 22. For example, the second parameter A2 can be any observable parameter that is function of a deflection, angle, and/or displacement of the resilient element 22. In one embodiment, the second sensor 26 comprises another (or the same) PSD configured to measure a time dependent position of a second light beam L2 on the PSD reflected by the first cantilever. Accordingly, the position of the light beam is a function of the time dependent parameter A2(t), e.g. movement, of the resilient element 22. In one embodiment, the system comprises a light source 25 configured to direct the second light beam L2 onto the resilient element 22. For example, the first and/or second light beams L1, L2 may be laser beams which may originate from different or the same light source 15 and/or 25. In one embodiment, the system comprises a measurement module 27 configured to receive time dependent measurements of the second parameter A2(t) from the second sensor 26 and calculate a derived second parameter M2. For example, the parameter M2 may comprise a maximum deflection of the resilient element.

In a preferred embodiment, as shown, the resilient element 22 comprises a second cantilever. In a further embodiment, the first cantilever 12 is arranged with respect to the second cantilever 22 to dynamically interact, e.g. tap, a surface of the second cantilever 22 with the AFM tip 11 of the first cantilever 12. Alternative to a second cantilever, also another resilient element can be used, preferably having a known or measurable force (spring) constant. For example, an elastic membrane (not shown) or a double clamped beam or other resilient deflecting surface can be used.

In one embodiment, the system comprises a data acquisition module 30 configured to collect the measured parameters A1, A2 from the respective sensors 16,26, and/or the parameters M1, M2 derived from these measurements, e.g. calculated by the measurement modules 17,27. The parameters may be processed by a calibration module 40. For example, using a known force constant K2 and measured bending amplitude M2 of the resilient element 22, a force "F12" (exerted between the AFM tip 11 and the resilient element 22) can be calculated. In one embodiment the calculated force F12 is stored as a function of the measured first parameter A1 or the derived parameter M1. For example, a calibration may comprise a lookup table or functional description correlating the relative or absolute amplitude M1 of the AFM tip 11 and the force F12 exerted between the AFM tip 11 and the resilient element 22.

Alternative, or in addition to correlating the force F12 to the amplitude of the oscillation, e.g. also the relative phase, e.g. with respect to the driving force D1(t) of the actuator 13 can be used.

Figure 1B:
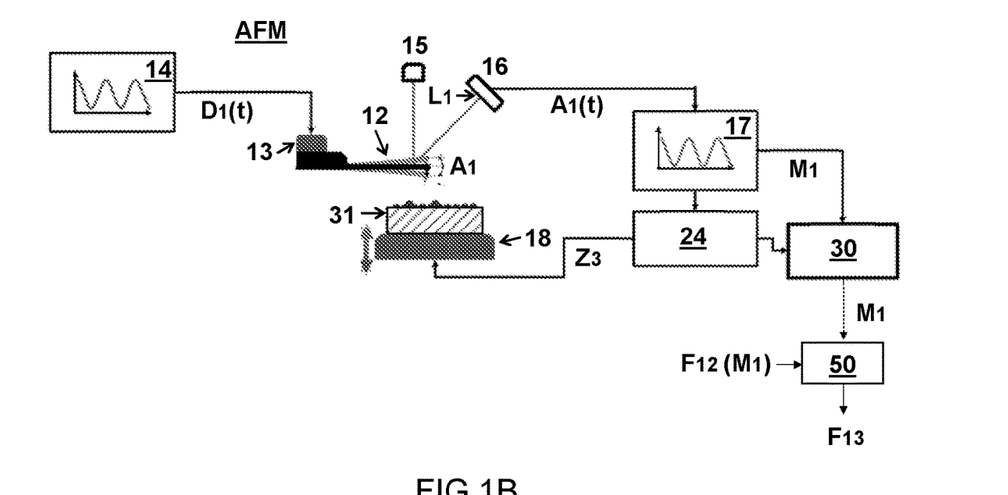
FIG. 1B schematically illustrates part of the AFM system interacting with a sample.

FIG. 1B schematically illustrates part of the AFM system described above interacting with a sample 31. The part relating to the optical beam deflection (OBD) measurement is not shown here. For example, the resilient element of FIG. 1A is replaced with a sample 31 after the calibration of the force. In one embodiment, the same system is used in a first configuration (shown in FIG. 1A) for calibration of the force F12 as a function of an observable parameter M1 of the oscillating cantilever 12; and in a second configuration (shown in FIG. 1B) for calculating a force F13 between the probe tip 11 and the sample 31 using the same measured parameter M1 of the oscillating AFM tip 11. For example, the system comprises a processor 50 to calculate the force F13 based on the measurement M1 and the calibration of F12 as a function of M1. The controller 24 may control a position of the sample surface 31 with respect to the first cantilever 12 by control of the translation stage 18 with control signal Z3.

Figure 2A:
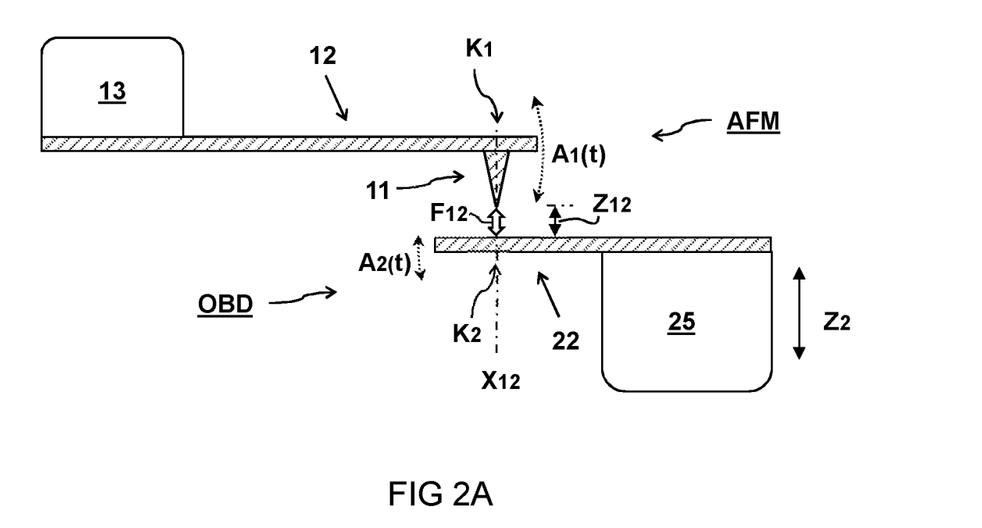
FIG. 2A schematically illustrate a close-up of the interaction between an AFM tip and a second cantilever in a dynamic mode.

FIG. 2A schematically illustrate a close-up of the interaction between the AFM tip 11 and the resilient element 22 as shown in FIG. 1A.

According to one embodiment, a method of calibrating a force F12 in a dynamic mode atomic force microscope may comprise one or more of the following steps. An AFM tip 11 is disposed on a first cantilever 12. The first cantilever 12 is actuated to oscillate the AFM tip 11 in a dynamic mode. For example, the dynamic mode is a tapping mode. A first sensor (not shown here) is configured to measure a first parameter A1 of the oscillating AFM tip 11. A resilient element 22 is provided having a force constant K2. A second sensor (not shown here) is configured to measure a second parameter A2 of the resilient element 22. The oscillating AFM tip 11 is moved in proximity to the resilient element 22 while measuring the first parameter A1 of the AFM tip 11 and the second parameter A2 of the resilient element 22. A force F12 between the oscillating AFM tip 11 and the resilient element 22 is calculated based on the measured second parameter A2 and calibrated force constant K2 of the resilient element 22. The calculated force F12 is stored as a function of the measured first parameter A1 of the oscillating AFM tip 11.

In one embodiment, the force constant K2 comprises a characterization of the second parameter A2 as a function of the force F12 on the resilient element 22. In one embodiment, the force constant K2 of the resilient element 22 is known, e.g. from factory specifications and/or theoretical calculation. However, it is typically found that the factory specifications cannot be used since they may just provide a range which is valid only on the edge. Furthermore, the factory may only provide a range due to the imperfections in fabrication process. Alternatively, or in addition, the force constant K2 may calibrated as a function of the second parameter A2, e.g. by the system as shown in FIG. 1A. For example, the calibration may comprise first calibrating the first (tapping) cantilever's spring constant K1 using a thermal noise method or other calibration methods. After the calibration, the first cantilever lands on the resilient element in contact mode (static mode). A step function is applied e.g. by a controller 24 on the translation stage 18, e.g. calibrated with a displacement sensor 28 (e.g. vibrometer) and corresponding readout device 29 providing feedback signal Z2m, wherein the first cantilever deflects together with the second cantilever due to the transition stage motion. Using the calibrated displacement of transition stage and deflection of the cantilever with the first (tapping) cantilever's spring constant K1, the spring constant of the resilient element at the contact point K2 can be calculated. Also other methods of calibrating the force constant K2 can be used, e.g. calibrating against a known standard.

Typically, an AFM cantilever for tapping mode has a spring constant in the range of 0.1 to 50 Newton per meter. In principle the force constant can also be any other value wherein the first cantilever does not stick on the resilient element due to attractive forces for example capillary or electrostatic forces and continue oscillation. In one embodiment, the force or spring constant K2 of the resilient element 22 (at the position X12 of interaction with the probe tip 11) is at least a factor ten higher than a force constant K1 of the first cantilever 12 (at the position X12 of the probe tip 11). In another or further embodiment, the force constant K2 of the resilient element 22 is at least ten Newton per metre, for example, 30, 100, 200, or 500 N/m. Preferably, the spring constant is high enough to act like a surface and low enough to deflect with each tap. In one embodiment, the second cantilever 22 is optionally at least two times shorter than the first cantilever 12.

Figure 2B:
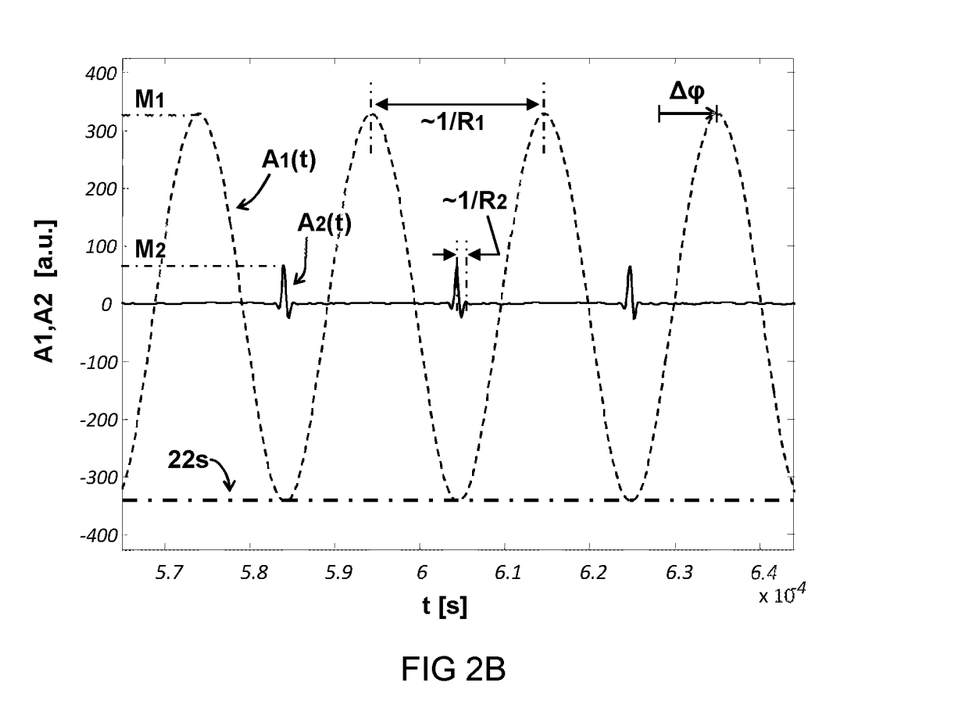
FIG. 2B illustrate a measurement of the first and second parameters.

FIG. 2B illustrate a measurement graph of the first and second parameters A1,A2 (in arbitrary units) as a function of time "t" (in seconds). The first parameter A1 follows a sinusoidal pattern indicative of a harmonic oscillation of the first cantilever 12. The second parameter A2 follows a more erratic pattern that is triggered at the moment that the cantilever tip 11 exerts a force on the surface of resilient element 22. The relative position of the resilient element is indicated in the graph by dash-dotted line 22s.

The cantilever 12 is typically driven by the actuator 13 at or around its fundamental frequency R1 (i.e. lowest resonance frequency). The frequency R1 is typically reciprocal to the period of the oscillation indicated as ~1/R1. In one embodiment, the first cantilever 11 has a fundamental frequency R1 typically between forty and five hundred kilohertz. In another or further embodiment, a fundamental frequency R2 of the resilient element 22 is at least a factor ten times higher than a fundamental frequency R1 of the first cantilever 12. For example, second cantilever 22 has a fundamental frequency higher than one megahertz, e.g. 1-20 MHz.

Using the parameters A1 and A2 measured as a function of time, further parameters can be derived, e.g. the amplitude or magnitude M1 and M2 of the oscillation or deflection. Also a relative phase shift $\Delta\varphi$ can be measured, e.g. by comparing the phase of the oscillation with and without interaction. The interaction forces may e.g. cause a delay in the phase of the oscillation and/or a decrease in the amplitude M1 of the oscillation.

Figure 3A:
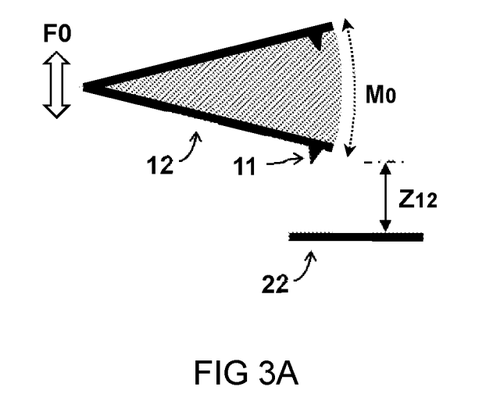
FIGS. 3A-3C schematically illustrate steps of calibrating the AFM cantilever and using the cantilever on a sample interface.
Figure 3B:
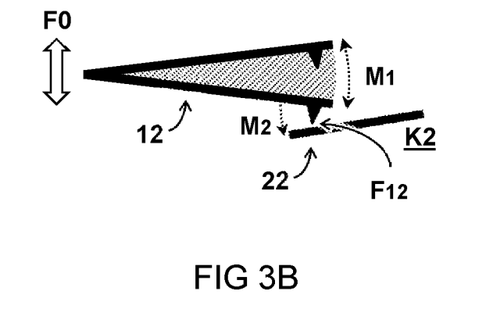
Figure 3C:
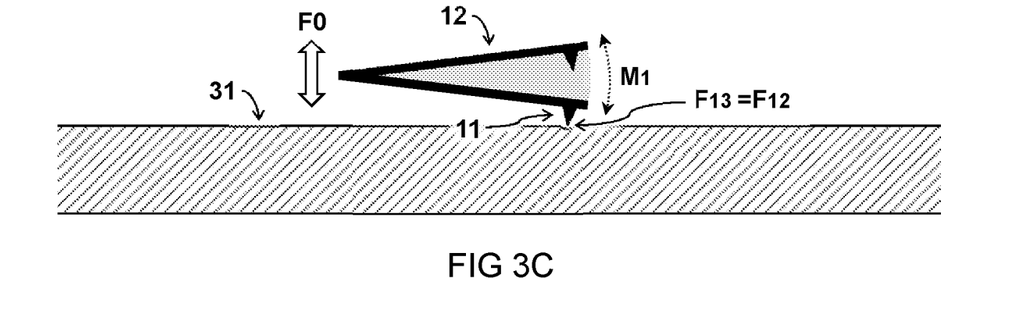

FIGS. 3A-3C schematically illustrate steps of calibrating and using the cantilever 12. The cantilever 12 having probe tip 11 is driven in a dynamic mode by an actuator (not shown) at a distance Z12 from the resilient element 22.

As shown in FIG. 3A, the cantilever 12 is first driven at frequency F0 without interaction with the resilient element 22. This causes the cantilever to oscillate with a first amplitude M0 at a frequency F0. For example, an AFM cantilever fluctuates due to thermal noise. Fundamental mode resonant frequency and quality factor (Q) of the cantilever can be extracted using thermal vibration spectra. By using the resonant frequency and quality factor the spring constant of the cantilever can be calibrated e.g. using Sader's Method. Using the calibrated first cantilever 12, a known force can be applied on the resilient element (e.g. second cantilever 22) to calibrate.

As shown in FIG. 3B, when the distance Z12 is lowered, this may cause a decreased amplitude M1 of the oscillating cantilever 12 as well as a bending of the resilient element 22, at least at the moment that the AFM tip 11 exerts the interaction force F12 on the resilient element 22. The maximum deflection M2 of the resilient element 22 may e.g. be correlated to the force constant K2 of the resilient element 22, to calculate the force F12.

As shown in FIG. 3C, after calibration, the same cantilever 12 can be used with the same settings of the actuator to image a sample 31. Since it is now known that an amplitude M1 and driving frequency F0 of the first cantilever 12 is correlated to a specific force F12, this knowledge can be used to calculate or approximate also the force F13 between the AFM tip 11 and the sample 31. This can be used e.g. for applying a specific force to the sample, or avoid applying too much force.

In one embodiment, a method of determining a force in a dynamic mode AFM measurement comprises calibrating the AFM as described herein, moving the oscillating tip 11 over a sample surface 31 while measuring the first parameter, and calculating the force F13 between the oscillating AFM tip 11 and the sample surface based on the stored force F12 as a function of the measured first parameter A1 or derived parameter M1 of the oscillating AFM tip 11. In another or further embodiment, a dynamic mode AFM is used for applying a predetermined force to a sample surface 31. For example, the method comprises determining the force F13 as described herein while varying a distance between the AFM tip 11 and the sample surface 31 until the predetermined force is achieved. It is also possible to do lithography using information from the setup. For example, the forces are first measured with respect to the oscillation frequency and amplitude set point and a 2D plot is made of the results. Using this result it can be determined when high force and low forces are applied, e.g. by tuning in the frequency and amplitude set point.

Figure 4A:
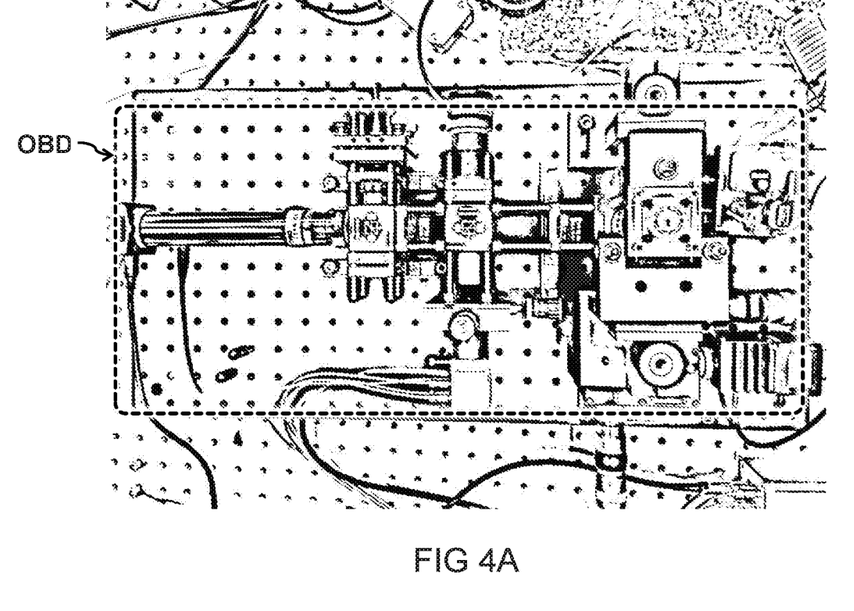
FIG. 4A show a top view photograph of an OBD.

FIG. 4A show a top view photograph of an experimental setup of optical beam deflection (OBD) system as described herein.

Figure 4B:
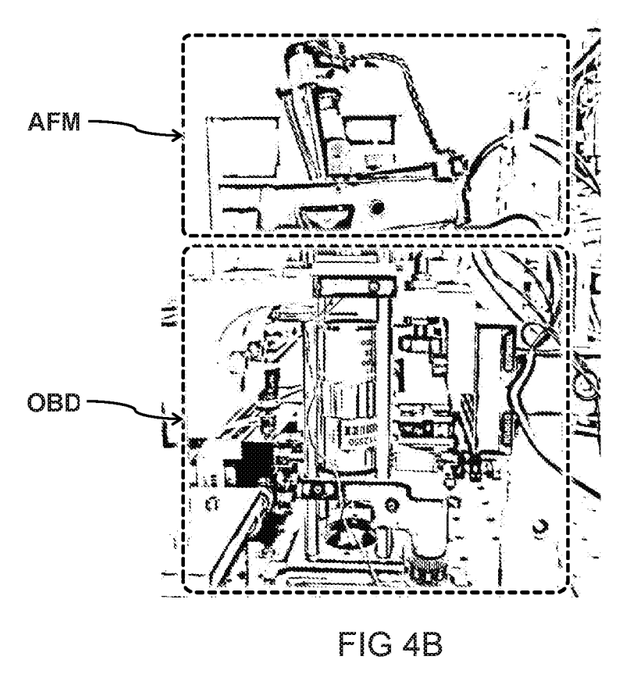
FIG. 4B show a side view photograph of the OBD with an AFM on top.

FIG. 4B show a side view photograph of the OBD with an AFM system on top.

For the purpose of clarity and a concise description, features are described herein as part of the same or separate embodiments, however, it will be appreciated that the scope may include embodiments having combinations of all or some of the features described. In the shown embodiments, a high resonance frequency cantilever is used as a force sensor for a lower resonance frequency tapping cantilever. However also other resilient elements and/or frequencies may be used. In the shown embodiments, an optical beam deflection (OBD) setup is used as a readout technique to measure the deflection of the sensing cantilever However, also other readout techniques for measuring the sensing cantilever motion may be envisaged by those skilled in the art having the benefit of the present disclosure for achieving a similar function and result.

Components may optionally be combined or split up into one or more alternative components. The various elements of the embodiments as discussed and shown offer certain advantages, such as prevention of sample or tip damage, higher precision of the measurement, and enabling extraction of quantitative physical and mechanical properties. Of course, it is to be appreciated that any one of the above embodiments or processes may be combined with one or more other embodiments or processes to provide even further improvements in finding and matching designs and advantages. It is appreciated that this disclosure offers particular advantages e.g. in AFM systems for industrial applications, where quantitative knowledge of force is desired, e.g. semiconductor, metrology, and/or bio-medical fields, and in general can be applied for any AFM system.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A method of calibrating force in a dynamic mode atomic force microscope (AFM), the method comprising;
   providing an AFM tip disposed on a first cantilever;
   actuating the first cantilever to oscillate the AFM tip in a dynamic mode;
   providing a first sensor configured to measure a first parameter of the AFN tip during oscillating of the AFM tip;
   providing a resilient element having a force constant, wherein a fundamental frequency of the resilient element is at least a factor ten higher than a fundamental frequency of the first cantilever;
   providing a second sensor configured to measure a second parameter of the resilient element;
   moving the AFM tip, while the AFM tip is oscillating due to the actuating, in proximity to the resilient element while measuring:
     a value of the first parameter of the AFM tip, and
     a value of the second parameter of the resilient element;
   calculating a force between the AFM tip and the resilient element based on:
     the measured value of the second parameter, and
     a calibrated value of the force constant of the resilient element; and
   storing a correlation between:
     the force between the AFM tip and, the resilient element, and
     the measured value of the first parameter of the AFM tip.

2. The method according to claim 1, wherein the resilient element comprises a second cantilever.

3. The, method according to claim 1, wherein the value of the first parameter is a function of one or more of the group consisting of: an amplitude, a frequency, and a phase of the oscillating of the AFM tip.

4. The method according to claim 1, wherein the second parameter is a function of one or more of the group consisting of: a deflection of the resilient element, and displacement of the resilient element.

5. The method according to claim 1, wherein the first sensor comprises a position sensitive detector configured to measure a position of a first light beam on the position sensitive detector reflected by the first cantilever, wherein the position of the first light beam is a function of the first parameter of the AFM tip during the oscillating.

6. The method according to claim 1, wherein the second sensor comprises a position sensitive detector configured to measure a position of a second light'beam on the position sensitive detector reflected by the first cantilever, wherein the position of the light beam on the position sensitive detector is a function of the second parameter of the resilient element.

7. The method according to claim 1, further comprising calibrating the force constant of the resilient element as a function of the measured value of the second parameter.

8. The method according to claim 1, further comprising determining a force in a dynamic mode atomic force microscope measurement by:
 moving the oscillating AFM tip over a sample surface while measuring the value of the first parameter; and
 calculating a force during the oscillating of the AFM tip, between the AFM tip and the sample surface based on the stored correlation between the calculated force and the measured first parameter of the oscillating AFM tip.

9. The method according to claim 8, further comprising using a dynamic mode atomic force microscope for applying a predetermined force to a sample surface by determining the force while varying a distance between the AlN tip and the sample surface until the predetermined force is achieved.

10. A dynamic mode atomic force microscope (AFM) system comprising:
 an ARM tip disposed on: a first cantilever;
 an actuator configured to actuate the first cantilever to oscillate the AFM tip in a dynamic mode;
 a first sensor configured to measure a first parameter of the AFM tip during oscillating of the AFM time;
 a resilient element having a force constant, wherein a fundamental frequency of the resilient element is at least a factor ten higher than a fundamental frequency of the first cantilever;
 a second sensor configured to measure a second parameter of the resilient element;
 a controller configured and programmed for:
  moving the AFM tip, while the AFM tip is oscillating due to the actuating by the actuator, in proximity to the resilient element while measuring:
   a value of the first parameter of the AFM tip, and
   a value of the second parameter of the resilient element;
  calculating a force between the AFM tip and the resilient element based on:
   the measured value of the second parameter, and
   a calibrated value of the force constant of the resilient element; and
  storing a correlation between:
   the force between the AFM tip and the resilient element, and
   the measured value of the first parameter of the AFM tip.

11. The system according to claim 10, wherein the resilient element comprises a second cantilever, wherein the first cantilever is arranged with respect to the second cantilever to tap a surface of the second cantilever with the AFM tip of the first cantilever.

12. The system according to claim 10, further comprising a light source configured to direct a first light beam onto the first cantilever, and wherein the first sensor comprises a position sensitive detector for measuring a deflection of the first light beam resulting from movement of the first cantilever.

13. The system according to claim 10, further comprising a feedback controller configured to control a relative distance between, the AFM tip and the resilient element based on the measured first parameter.

14. The system according to claim 10, further comprising a light source configured to direct a second light beam onto the resilient element, and
 wherein the second sensor comprises a position sensitive detector for measuring a deflection of the second light beam resulting from movement of the resilient element.

* * * * *